United States Patent
Sato et al.

(10) Patent No.: US 12,474,571 B2
(45) Date of Patent: Nov. 18, 2025

(54) SENSOR DEVICE, HOUSING, AND COVER PORTION

(71) Applicant: Pioneer Corporation, Tokyo (JP)

(72) Inventors: Ryoya Sato, Kawagoe (JP); Yuji Uehara, Kawagoe (JP); Hiroshi Hosoyamada, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 542 days.

(21) Appl. No.: 17/796,213

(22) PCT Filed: Jan. 7, 2021

(86) PCT No.: PCT/JP2021/000311
§ 371 (c)(1),
(2) Date: Jul. 28, 2022

(87) PCT Pub. No.: WO2021/153181
PCT Pub. Date: Aug. 5, 2021

(65) Prior Publication Data
US 2023/0084222 A1 Mar. 16, 2023

(30) Foreign Application Priority Data
Jan. 28, 2020 (JP) .................. 2020-011447

(51) Int. Cl.
*G02B 27/00* (2006.01)
*B60S 1/02* (2006.01)
(Continued)

(52) U.S. Cl.
CPC .......... *G02B 27/0006* (2013.01); *B60S 1/026* (2013.01); *B60S 1/56* (2013.01);
(Continued)

(58) Field of Classification Search
CPC ........ G02B 27/0006; B60S 1/026; B60S 1/56; G01S 7/481; G01S 7/497; G01S 17/931;
(Continued)

(56) References Cited

U.S. PATENT DOCUMENTS

| 5,463,384 A | 10/1995 | Juds |
| 9,297,901 B2 | 3/2016 | Bayha et al. |

(Continued)

FOREIGN PATENT DOCUMENTS

| EP | 2095685 B1 | 2/2013 |
| JP | H05157830 A | 6/1993 |

(Continued)

OTHER PUBLICATIONS

Extended European Search Report received in EP 21747706.6, dated Mar. 1, 2024, in 10 pages.

(Continued)

*Primary Examiner* — Mariam Qureshi
(74) *Attorney, Agent, or Firm* — Procopio, Cory, Hargreaves & Savitch LLP

(57) ABSTRACT

A cover portion (300) includes a transmission portion (310) and a heater portion (320). At least a portion of the heater portion (320) is disposed on a lower side (negative side of a sixth direction (V)) of the transmission portion (310) and on one of opposite lateral sides (positive side of a fifth direction (L)) of the transmission portion (310). An amount of heat generated per unit length of the heater portion (320) in a direction along an outer periphery of the transmission portion (310) on the lower side (negative side of the sixth direction (V)) of the transmission portion (310) is higher than an amount of heat generated per unit length of the heater portion (320) in a direction along the outer periphery (Continued)

of the transmission portion (310) on the one of the opposite lateral sides (positive side of the fifth direction (L)) of the transmission portion (310).

7 Claims, 8 Drawing Sheets

(51) Int. Cl.
   *B60S 1/56* (2006.01)
   *G01S 7/481* (2006.01)
   *G01S 7/497* (2006.01)
   *G01S 17/931* (2020.01)
   *H04N 23/51* (2023.01)
   *H05B 3/84* (2006.01)

(52) U.S. Cl.
   CPC .............. *G01S 7/481* (2013.01); *G01S 7/497* (2013.01); *G01S 17/931* (2020.01); *H04N 23/51* (2023.01); *H05B 3/84* (2013.01); *G01S 2007/4977* (2013.01); *H05B 2203/003* (2013.01); *H05B 2203/006* (2013.01); *H05B 2203/013* (2013.01)

(58) Field of Classification Search
   CPC ........... G01S 2007/4977; G01S 7/4813; G01S 17/08; G01S 7/4817; H04N 23/51; H05B 3/84; H05B 2203/003; H05B 2203/006; H05B 2203/013
   See application file for complete search history.

(56) References Cited

U.S. PATENT DOCUMENTS

| | | |
|---|---|---|
| 10,887,496 B2 | 1/2021 | Ichimura et al. |
| 2003/0006223 A1 | 1/2003 | Davis |
| 2005/0145796 A1* | 7/2005 | Davis ..................... H05B 3/84 |
| | | 250/343 |
| 2010/0032421 A1* | 2/2010 | Martinez ................. H05B 3/84 |
| | | 219/520 |
| 2010/0219173 A1 | 9/2010 | Gruber |
| 2014/0320845 A1 | 10/2014 | Bayha et al. |
| 2020/0137277 A1 | 4/2020 | Ichimura et al. |
| 2020/0348397 A1 | 11/2020 | Yamamoto |

FOREIGN PATENT DOCUMENTS

| | | |
|---|---|---|
| JP | H08029535 A | 2/1996 |
| JP | H10132921 A | 5/1998 |
| JP | H11211821 A | 8/1999 |
| JP | 2015506459 A | 3/2015 |
| JP | 2017168310 A | 9/2017 |
| JP | 2018185435 A | 11/2018 |
| JP | 2019128236 A | 1/2019 |
| WO | 2020004351 A1 | 1/2020 |

OTHER PUBLICATIONS

International Search Report for International Application No. PCT/JP2021/000311, mailed on Mar. 30, 2021, 2 pages.
Office Action dated Mar. 4, 2025 in Chinese patent application No. 202180011112.5, 9 pages.

* cited by examiner

SENSOR DEVICE, HOUSING, AND COVER PORTION

CROSS-REFERENCE TO RELATED APPLICATIONS

This application is a U.S. National Stage entry of PCT Application No: PCT/JP2021/000311 filed Jan. 7, 2021, which claims priority to Japanese Patent Application No. 2020-011447 filed Jan. 28, 2020, the contents of which are incorporated herein by reference.

TECHNICAL FIELD

The present invention relates to a sensor device, a housing, and a cover portion.

BACKGROUND ART

In recent years, an optical device (for example, a light detection and ranging (LiDAR) or a radio detection and ranging (RADAR)) including a movable reflecting unit such as a micro-electromechanical systems (MEMS) mirror has been developed. The movable reflecting unit of the optical device scans an object located outside the optical device, with an electromagnetic wave such as an infrared ray.

For example, as disclosed in Patent Document 1, an optical device may be accommodated in a housing. The optical device of Patent Document 1 includes a light projecting unit, a scanning unit, and a light receiving unit. The light projecting unit, the scanning unit, and the light receiving unit are accommodated in the housing.

Patent Document 2 discloses that a lens of a laser radar is provided with a heater portion and a thermistor portion. The heater portion is connected to a heater terminal. Water droplets adhering to the lens are prevented from being frozen by heating the lens with the heater portion. A temperature of the lens heated by the heater portion is controlled by measuring the temperature of the lens using the thermistor portion.

RELATED DOCUMENT

Patent Document

Patent Document 1: Japanese Unexamined Patent Publication No. 2019-128236
Patent Document 2: Japanese Unexamined Patent Publication No. H5-157830

SUMMARY OF THE INVENTION

Technical Problem

For example, as disclosed in Patent Document 2, the heater portion may be disposed to heat and remove foreign matter such as water droplets adhering to a transmission portion (for example, a lens) through which an electromagnetic wave emitted from an optical device transmits. In this case, it is desirable that the transmission portion is efficiently heated by the heater portion.

An example of the problem being solved by the present invention is to dispose a heater portion to efficiently heat a transmission portion.

Solution to Problem

The invention according to an exemplary aspect is a sensor device including: an optical device that emits an electromagnetic wave; a housing that accommodates the optical device; a transmission portion provided in the housing to transmit the electromagnetic wave of the optical device; and a heater portion of which at least a portion is disposed on a lower side of the transmission portion and on one of opposite lateral sides of the transmission portion. An amount of heat generated per unit length of the heater portion in a direction along an outer periphery of the transmission portion on the lower side of the transmission portion is higher than an amount of heat generated per unit length of the heater portion in a direction along the outer periphery of the transmission portion on the one of the opposite lateral sides of the transmission portion.

The invention according to another exemplary aspect is a housing to accommodate an optical device that emits an electromagnetic wave, including: a transmission portion that transmits the electromagnetic wave of the optical device; and a heater portion of which at least a portion is disposed on a lower side of the transmission portion and on one of opposite lateral sides of the transmission portion. An amount of heat generated per unit length of the heater portion in a direction along an outer periphery of the transmission portion on the lower side of the transmission portion is higher than an amount of heat generated per unit length of the heater portion in a direction along the outer periphery of the transmission portion on the one of the opposite lateral sides of the transmission portion.

The invention according to another exemplary aspect is a cover portion to be attached to a housing to accommodate an optical device that emits an electromagnetic wave, including: a transmission portion that transmits the electromagnetic wave of the optical device; and a heater portion of which at least a portion is disposed on a lower side of the transmission portion and on one of opposite lateral sides of the transmission portion. An amount of heat generated per unit length of the heater portion in a direction along an outer periphery of the transmission portion on the lower side of the transmission portion is higher than an amount of heat generated per unit length of the heater portion in a direction along the outer periphery of the transmission portion on the one of the opposite lateral sides of the transmission portion.

DESCRIPTION OF EMBODIMENTS

Hereinafter, an embodiment of the present invention will be described with reference to the drawings. Incidentally, in all the drawings, the same components are denoted by the same reference signs, and a description thereof will not be repeated.

Figure 1:
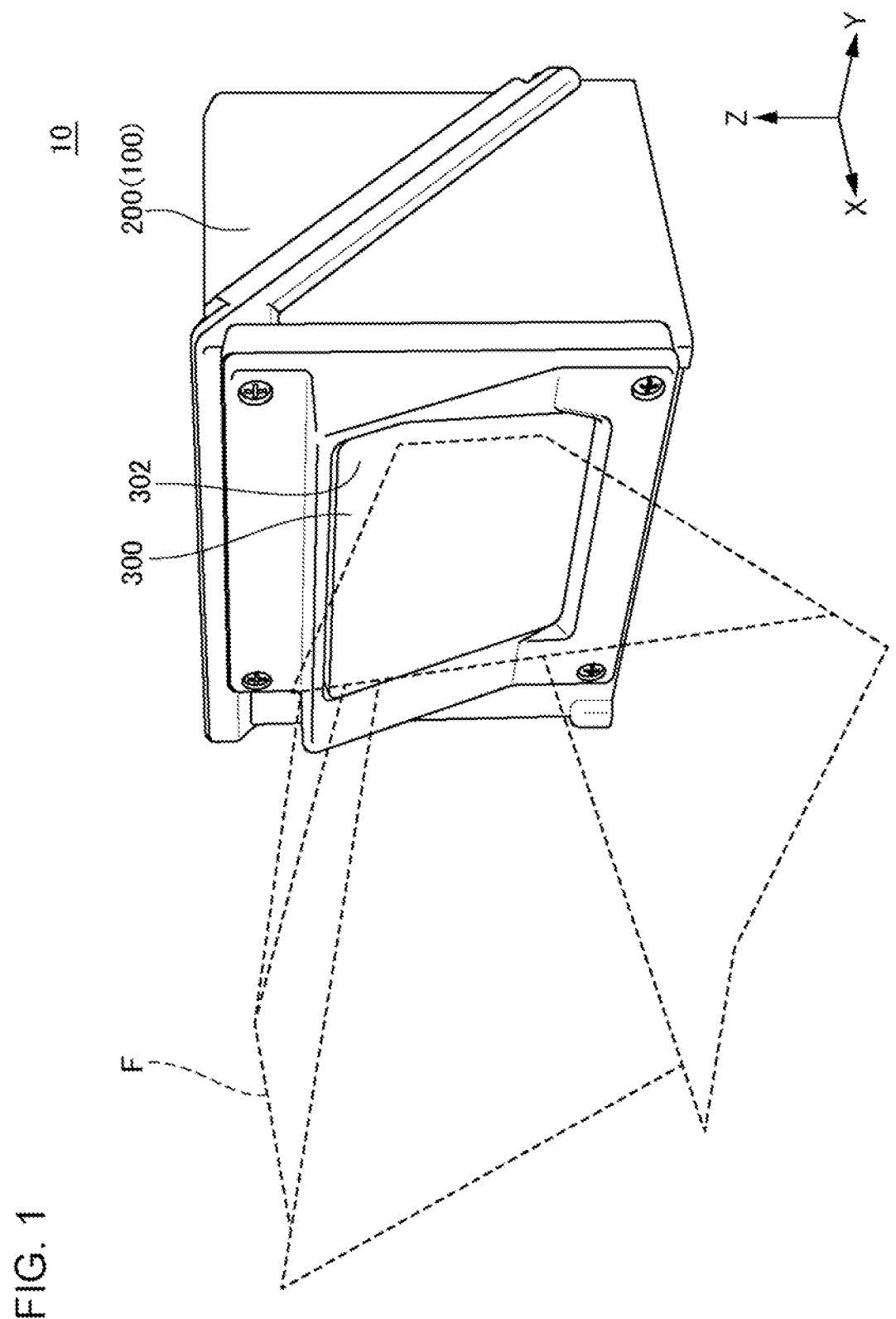
FIG. 1 is a view of a sensor device according to an embodiment when seen obliquely from the front.
Figure 2:
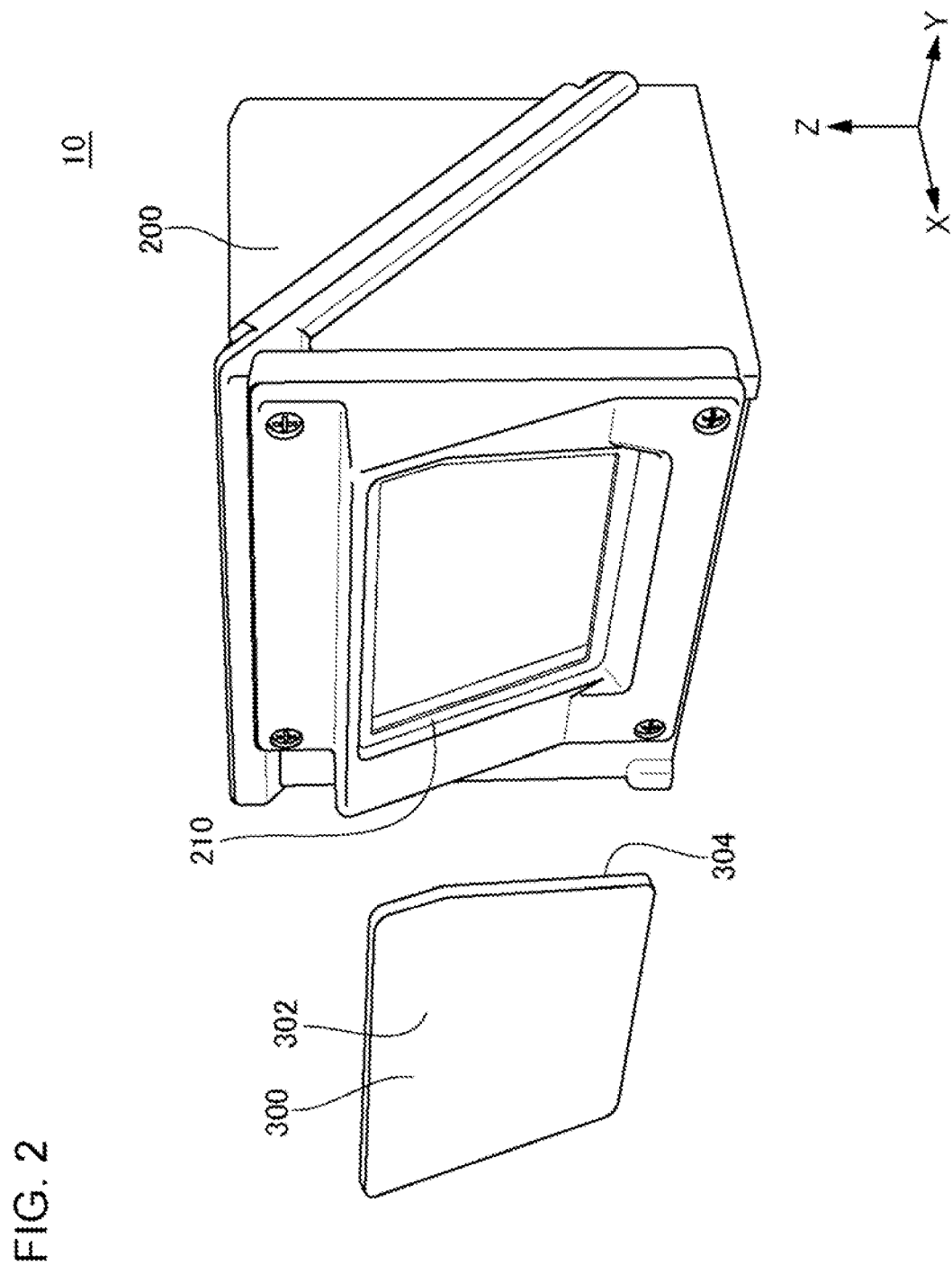
FIG. 2 is an exploded view of the sensor device illustrated in FIG. 1.

FIG. 1 is a view of a sensor device 10 according to an embodiment when seen obliquely from the front. FIG. 2 is an exploded view of the sensor device 10 illustrated in FIG. 1. Incidentally, in FIG. 2, an optical device 100 accommodated in a housing 200 illustrated in FIG. 1 is not illustrated.

The sensor device 10 includes the optical device 100, the housing 200, and a cover portion 300. The optical device 100 emits an electromagnetic wave. The housing 200 accommodates the optical device 100. The cover portion 300 is attached to the housing 200. The cover portion 300 has a first surface 302 and a second surface 304. The first surface 302 and the second surface 304 of the cover portion 300 are located opposite to each other.

In FIGS. 1 and 2, a first direction X is a front-rear direction of the sensor device 10 (housing 200). A positive direction of the first direction X (direction indicated by an arrow indicating the first direction X) is a front direction of the sensor device 10 (housing 200). A negative direction of the first direction X (direction opposite to the direction indicated by the arrow indicating the first direction X) is a rear direction of the sensor device 10 (housing 200). A second direction Y intersects the first direction X and specifically, is orthogonal thereto. The second direction Y is a left-right direction of the sensor device 10 (housing 200). A positive direction of the second direction Y (direction indicated by an arrow indicating the second direction Y) is a right direction when seen from the front (positive direction of the first direction X) of the sensor device 10 (housing 200). A negative direction of the second direction Y (direction opposite to the direction indicated by the arrow indicating the second direction Y) is a left direction when seen from the front (positive direction of the first direction X) of the sensor device 10 (housing 200). A third direction Z intersects both the first direction X and the second direction Y and specifically, is orthogonal thereto. The third direction Z is an up-down direction of the sensor device 10 (housing 200). A positive direction of the third direction Z (direction indicated by an arrow indicating the third direction Z) is an up direction of the sensor device 10 (housing 200). A negative direction of the third direction Z (direction opposite to the direction indicated by the arrow indicating the third direction Z) is a down direction of the sensor device 10 (housing 200).

The optical device 100 has a field of view F that expands from a predetermined position in one direction (positive direction of the first direction X). The predetermined position is a starting point at which the field of view F starts to expand. The predetermined position is located inside the housing 200. The field of view F is a region where the optical device 100 can detect a target such as an object. For example, the sensor device 10 (optical device 100) can emit an electromagnetic wave such as an infrared ray from the predetermined position in any direction in the field of view F.

The optical device 100 may be detachably attached to the housing 200 or may be fixed to be non-detachable from the housing 200. When the optical device 100 is detachably attached to the housing 200, the optical device 100 may be fixed to the housing 200 by, for example, a fixing tool such as a screw. In this case, the housing 200 may be manufactured, sold, or used in a state where the optical device 100 is not attached to the housing 200. When the optical device 100 is fixed to be non-detachable from the housing 200, the optical device 100 may be integrally formed with the housing 200 by, for example, a joining process such as welding.

The cover portion 300 is a cover with the first surface 302 of the cover portion 300 and the second surface 304 of the cover portion 300 both being flat and parallel to each other. The second surface 304 of the cover portion 300 is attached to an attachment frame 210 of the housing 200 by, for example, a pressure-sensitive adhesive such as double-sided tape. Accordingly, the cover portion 300 is disposed on a front surface side (positive side of the first direction X) of the housing 200 such that the first surface 302 of the cover portion 300 is disposed in front of (positive side of the first direction X) of the housing 200 (sensor device 10) with respect to the second surface 304 of the cover portion 300. Namely, when the cover portion 300 is attached to the housing 200, the first surface 302 and the second surface 304 of the cover portion 300 are a front surface (surface on the positive side of the first direction X) and a rear surface (surface on a negative side of the first direction X) of the cover portion 300, respectively. Incidentally, a method of attaching the cover portion 300 to the housing 200 is not limited to the method according to the present embodiment. The cover portion 300 may be integrated with the housing 200. Further, the cover portion 300 may be a lens with at least one of the first surface 302 of the cover portion 300 and the second surface 304 of the cover portion 300 being curved.

The cover portion 300 intersects the field of view F of the optical device 100. In the present embodiment, the cover portion 300 is obliquely inclined with respect to a height direction (third direction Z) of the housing 200 such that an upper portion of the cover portion 300 (portion on a positive side of the third direction Z) protrudes toward the front (positive direction of the first direction X) of the sensor device 10 (housing 200) from a lower portion of the cover portion 300 (portion on a negative side of the third direction Z). In other words, the lower portion of the cover portion 300 (portion on the negative side of the third direction Z) is located closer to the predetermined position of the field of view F in the one direction (positive direction of the first direction X) of the field of view F than the upper portion of the cover portion 300 (portion on the positive side of the third direction Z) is. However, the disposition of the cover portion 300 with respect to the housing 200 is not limited to the disposition according to the present embodiment. For example, the cover portion 300 may be disposed in parallel to the height direction (third direction Z) of the housing 200.

Figure 3:
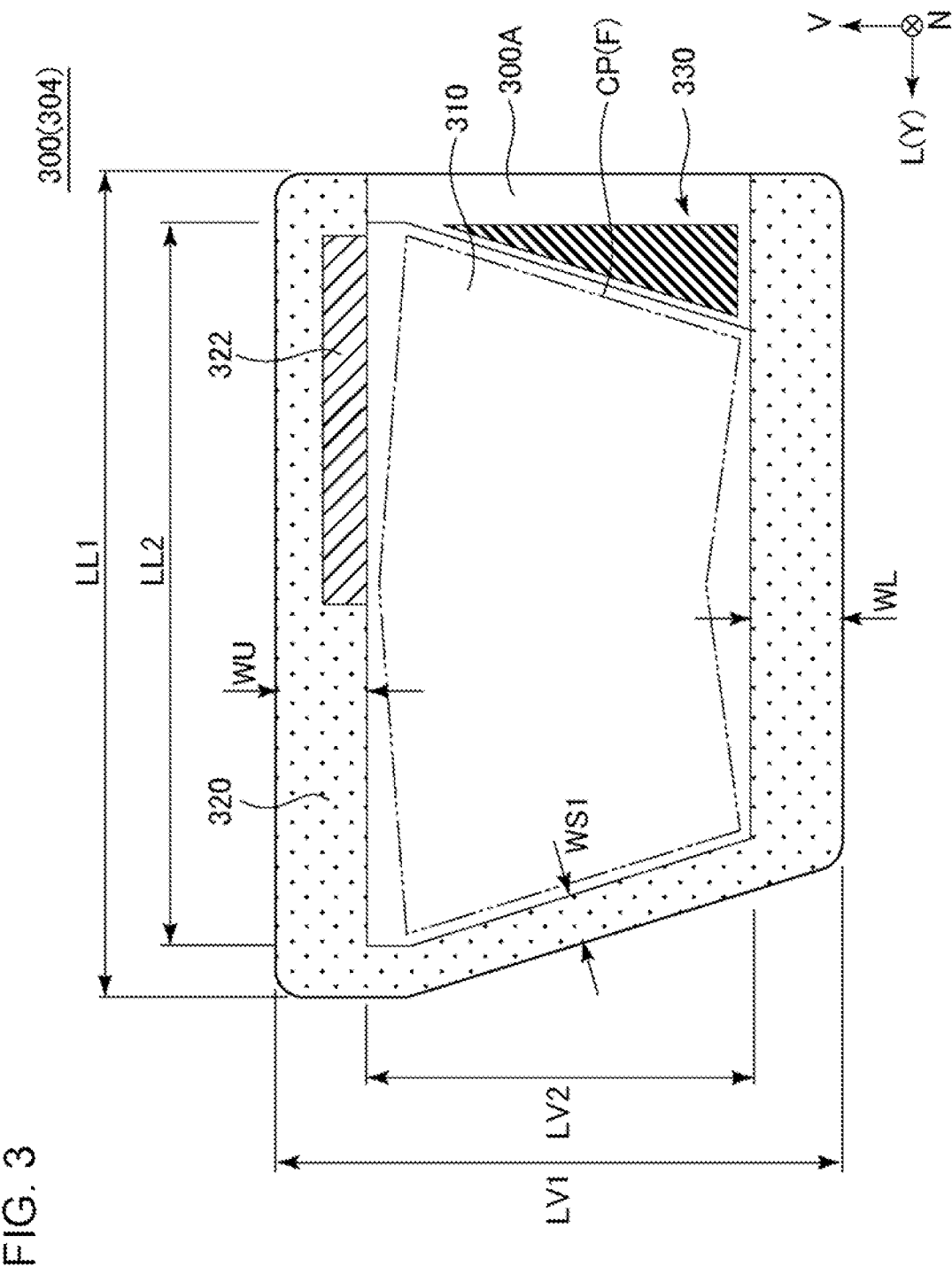
FIG. 3 is a plan view of a second surface of a cover portion illustrated in FIGS. 1 and 2.

FIG. 3 is a plan view of the second surface 304 of the cover portion 300 illustrated in FIGS. 1 and 2.

The cover portion 300 includes a base material 300A, a heater portion 320, a heater terminal 322, and a thermistor portion 330. The cover portion 300 (base material 300A) includes a transmission portion 310 (namely, a region defined as the transmission portion 310). In FIG. 3, an outer edge of an intersection portion between the field of view F (FIG. 1) of the optical device 100 and the cover portion 300 is illustrated as an intersection portion CP.

In FIG. 3, a fourth direction N is a direction perpendicular to the cover portion 300. The fourth direction N may be, for example, a thickness direction of the cover portion 300. A positive direction of the fourth direction N (direction from the front toward the back of the drawing sheet of FIG. 3) is a direction from the second surface 304 of the cover portion 300 toward the first surface 302 (FIGS. 1 and 2). The positive direction of the fourth direction N may be, for example, a normal direction of the first surface 302 of the cover portion 300 (FIGS. 1 and 2). A negative direction of the fourth direction N (direction from the back toward the front of the drawing sheet of FIG. 3) is a direction from the first surface 302 (FIGS. 1 and 2) of the cover portion 300 toward the second surface 304. The negative direction of the fourth direction N may be, for example, a normal direction of the second surface 304 of the cover portion 300. A fifth direction L intersects the fourth direction N and specifically, is orthogonal thereto. The fifth direction L is the same direction as the second direction Y illustrated in FIGS. 1 and 2. The fifth direction L is a lateral direction (left-right direction) of the cover portion 300. A positive direction of the fifth direction L (direction indicated by an arrow indicating the fifth direction L) is a left direction of the cover portion 300 when seen from the second surface 304 (negative direction of the fourth direction N) of the cover portion 300. A negative direction of the fifth direction L (direction opposite to the direction indicated by the arrow indicating the fifth direction L) is a right direction of the cover portion 300 when seen from the second surface 304 of the cover portion 300 (negative direction of the fourth direction N). A sixth direction V intersects both the fourth direction N and the fifth direction L and specifically, is orthogonal thereto. The sixth direction V is a longitudinal direction (up-down direction) of the cover portion 300. A positive direction of the sixth direction V (direction indicated by an arrow indicating the sixth direction V) is an up direction of the cover portion 300. A negative direction of the sixth direction V (direction opposite to the direction indicated by the arrow indicating the sixth direction V) is a down direction of the cover portion 300.

The base material 300A has a light transmission property. The base material 300A has, for example, a transmittance of more than 50%, preferably 75% or more, more preferably 95% or more with respect to an electromagnetic wave (for example, light such as an infrared ray) emitted from the optical device 100. The base material 300A is, for example, an inorganic material having a light transmission property (for example, glass) or an organic material having a light transmission property (for example, resin having a light transmission property such as polycarbonate, or acrylic resin).

The base material 300A (cover portion 300) has a shape of a substantially quadrilateral shape with a portion thereof being cut out, when seen from the direction perpendicular to the base material 300A (cover portion 300) (fourth direction N). The "substantially quadrilateral shape" of the base material 300A (cover portion 300) means not only an exact quadrilateral shape but also, for example, a figure similar to the exact quadrilateral shape, such as a chamfered quadrilateral shape or a quadrilateral shape having a side on which a notch is formed. In the present embodiment, the quadrilateral shape of the base material 300A (cover portion 300) is a rectangular shape (including a square shape). However, the quadrilateral shape of the base material 300A (cover portion 300) may be a quadrilateral shape different from a rectangular shape (for example, a trapezoidal shape, a rhomboidal shape, or a parallelogram shape). In the present embodiment, the substantially quadrilateral shape of the base material 300A (cover portion 300) (shape in which the foregoing portion is not cut out) includes a pair of sides parallel to the fifth direction L and a pair of sides parallel to the sixth direction V. In the substantially quadrilateral shape of the base material 300A (cover portion 300), a corner between one side on a positive side of the fifth direction L and one side on a negative side of the sixth direction V is cut out. According to the present embodiment, the size of the base material 300A (cover portion 300), namely, the size of the housing 200 can be reduced as compared to a case where the foregoing portion (foregoing corner) is not cut out.

A length LV1 of the base material 300A (cover portion 300) in the longitudinal direction (sixth direction V) is shorter than a length LL1 of the base material 300A (cover portion 300) in the lateral direction (fifth direction L). The length LV1 of the base material 300A (cover portion 300) in the longitudinal direction (sixth direction V) is a maximum length of the base material 300A (cover portion 300) in the longitudinal direction (sixth direction V) when the length of the base material 300A (cover portion 300) in the longitudinal direction (sixth direction V) varies depending on the position of the base material 300A (cover portion 300) in the lateral direction (fifth direction L) as in the present embodiment. The length LL1 of the base material 300A (cover portion 300) in the lateral direction (fifth direction L) is a maximum length of the base material 300A (cover portion 300) in the lateral direction (fifth direction L) when the length of the base material 300A (cover portion 300) in the lateral direction (fifth direction L) varies depending on the position of the base material 300A (cover portion 300) in the longitudinal direction (sixth direction V) as in the present embodiment. The base material 300A (cover portion 300) has a shape asymmetric with respect to a straight line passing through a center in the fifth direction L of the base material 300A (cover portion 300) along the sixth direction V. It can be said that the base material 300A (cover portion 300) has a substantially pentagonal shape (chamfered pentagonal shape).

The shape of the base material 300A (cover portion 300) is not limited to the shape according to the present embodiment. For example, the length LV1 of the base material 300A (cover portion 300) in the longitudinal direction (sixth direction V) may be equal to or greater than the length LL1 of the base material 300A (cover portion 300) in the lateral direction (fifth direction L). The base material 300A (cover portion 300) may have a shape different from the substantially quadrilateral shape (for example, a polygonal shape other than a quadrilateral shape) with a portion thereof being cut out. Alternatively, the base material 300A (cover portion 300) may have the substantially quadrilateral shape itself (shape with the foregoing portion being not cut out). In the substantially quadrilateral shape of the base material 300A (cover portion 300), not only the corner cut out in the present embodiment (corner between the one side on the positive side of the fifth direction L and the one side on the negative side of the sixth direction V) but also at least another corner (for example, a corner between one side on the negative side of the fifth direction L and the one side on the negative side of the sixth direction V) may be cut out. In this case, the base material 300A (cover portion 300) may have a shape symmetric with respect to the straight line passing through the center in the fifth direction L of the base material 300A (cover portion 300) along the sixth direction V.

From the viewpoint of reducing the size of the base material 300A (cover portion 300) in order to suppress the size of the housing 200 in the first direction X or in the second direction Y, an area (area when seen from the direction perpendicular to the fourth direction N) of the foregoing portion cut out from the substantially quadrilateral shape of the base material 300A (cover portion 300) may be, for example, 5% or more, 7.5% or more, or 10% or more of an area (area when seen from the direction perpendicular to the fourth direction N) of the substantially quadrilateral shape itself (substantially quadrilateral shape with the foregoing portion being not cut out) of the base material 300A (cover portion 300). From the viewpoint of securing the size of the transmission portion 310 of the base material 300A (cover portion 300), the area (area when seen from the direction perpendicular to the fourth direction N) of the foregoing portion cut out from the substantially quadrilateral shape of the base material 300A (cover portion 300) may be, for example, 30% or less, 25% or less, or 20% or less of the area (area when seen from the direction perpendicular to the fourth direction N) of the substantially quadrilateral shape itself (substantially quadrilateral shape with the foregoing portion being not cut out) of the base material 300A (cover portion 300).

The transmission portion 310 is a region of the base material 300A surrounded by regions in which the heater portion 320 and the thermistor portion 330 are disposed, when seen from the direction perpendicular to the base material 300A (cover portion 300) (fourth direction N). Namely, the transmission portion 310 is defined by the regions in which the heater portion 320 and the thermistor portion 330 are disposed, when seen from the direction perpendicular to the base material 300A (cover portion 300) (fourth direction N). Further, in other words, the region where the heater portion 320 is disposed and the region where the thermistor portion 330 is disposed are defined not to intrude on the transmission portion 310. A pressure-sensitive adhesive such as double-sided tape that attaches the second surface 304 of the cover portion 300 to the attachment frame 210 of the housing 200 (FIG. 2) can be provided in a region of the second surface 304 of the cover portion 300 surrounding the transmission portion 310. In this case, the pressure-sensitive adhesive overlaps the heater portion 320 in the thickness direction (fourth direction N) of the base material 300A (cover portion 300). For this reason, it is desirable that the pressure-sensitive adhesive has heat resistance.

When seen from the direction perpendicular to the base material 300A (cover portion 300) (fourth direction N), the transmission portion 310 has a shape of a substantially quadrilateral shape with a portion thereof being cut out. The "substantially quadrilateral shape" of the transmission portion 310 means not only an exact quadrilateral shape but also, for example, a figure similar to the exact quadrilateral shape, such as a chamfered quadrilateral shape or a quadrilateral shape having a side on which a notch is formed. In the present embodiment, the quadrilateral shape of the transmission portion 310 is a rectangular shape (including a square shape). However, the quadrilateral shape of the transmission portion 310 may be a quadrilateral shape different from a rectangular shape (for example, a trapezoidal shape, a rhomboidal shape, or a parallelogram shape). In the present embodiment, the substantially quadrilateral shape (shape in which the foregoing portion is not cut out) of the transmission portion 310 includes a pair of sides parallel to the fifth direction L and a pair of sides parallel to the sixth direction V. In the substantially quadrilateral shape of the transmission portion 310, a corner between one side on the positive side of the fifth direction L and one side on the negative side of the sixth direction V and a corner between one side on the negative side of the fifth direction L and the one side on the negative side of the sixth direction V are cut out. According to the present embodiment, a region where the foregoing portion (foregoing corner) is cut out can be secured as a space for providing the thermistor portion 330 (details will be described later). Therefore, according to the present embodiment, the size of a space required to provide the transmission portion 310 and the thermistor portion 330, namely, the size of the housing 200 can be reduced as compared to a case where the foregoing portion (foregoing corner) is not cut out.

A length LV2 of the transmission portion 310 in the longitudinal direction (sixth direction V) is shorter than a length LL2 of the transmission portion 310 in the lateral direction (fifth direction L). The length LV2 of the transmission portion 310 in the longitudinal direction (sixth direction V) is a maximum length of the transmission portion 310 in the longitudinal direction (sixth direction V) when the length of the transmission portion 310 in the longitudinal direction (sixth direction V) varies depending on the position of the transmission portion 310 in the lateral direction (fifth direction L) as in the present embodiment. The length LL2 of the transmission portion 310 in the lateral direction (fifth direction L) is a maximum length of the transmission portion 310 in the lateral direction (fifth direction L) when the length of the transmission portion 310 in the lateral direction (fifth direction L) varies depending on the position of the transmission portion 310 in the longitudinal direction (sixth direction V) as in the present embodiment. The transmission portion 310 has a shape symmetric with respect to a straight line passing through a center in the fifth direction L of the transmission portion 310 along the sixth direction V. It can be said that the transmission portion 310 has a substantially hexagonal shape.

The shape of the transmission portion 310 is not limited to the shape according to the present embodiment. For example, the length LV2 of the transmission portion 310 in the longitudinal direction (sixth direction V) may be equal to or greater than the length LL2 of the transmission portion 310 in the lateral direction (fifth direction L). The transmission portion 310 may have a shape different from the substantially quadrilateral shape (for example, a polygonal shape other than a quadrilateral shape) with a portion thereof being cut out. Alternatively, the transmission portion 310 may have the substantially quadrilateral shape itself (shape with the foregoing portion being not cut out). In the substantially quadrilateral shape of the transmission portion 310, one of the two corners cut out in the present embodiment (the corner between the one side on the positive side of the fifth direction L and the one side on the negative side of the sixth direction V and the corner between the one side on the negative side of the fifth direction L and the one side on the negative side of the sixth direction V) may not be cut out. In this case, the transmission portion 310 may have a shape asymmetric with respect to the straight line passing through the center in the fifth direction L of the transmission portion 310 along the sixth direction V.

From the viewpoint of securing the space for providing the thermistor portion 330 (details will be described later), an area (area when seen from the direction perpendicular to the fourth direction N) of the foregoing portion cut out from the substantially quadrilateral shape of the transmission portion 310 may be, for example, 10% or more of an area (area when seen from the direction perpendicular to the fourth direction N) of the substantially quadrilateral shape itself (substantially quadrilateral shape with the foregoing portion being not cut out) of the transmission portion 310. From the viewpoint of securing the size of the transmission portion 310, the area (area when seen from the direction perpendicular to the fourth direction N) of the foregoing portion cut out from the substantially quadrilateral shape of the transmission portion 310 may be, for example, 20% or less of the area (area when seen from the direction perpen-dicular to the fourth direction N) of the substantially quadrilateral shape itself (substantially quadrilateral shape with the foregoing portion being not cut out) of the transmission portion 310.

In the present embodiment, a width (width in the fifth direction L) on an upper side (positive side of the sixth direction V) of the transmission portion 310 is narrower than a width (width in the fifth direction L) on a lower side (negative side of the sixth direction V) of the transmission portion 310. Even when the transmission portion 310 has such a shape, as described with reference to FIG. 1, the transmission portion 310 (cover portion 300) is inclined with respect to the height direction (third direction Z) of the sensor device 10 (housing 200). In this case, a width (width in the fifth direction L) on a lower side (negative side of the sixth direction V) of the intersection portion CP of the field of view F is narrower than a width (width in the fifth direction L) on an upper side (positive side of the sixth direction V) of the intersection portion CP of the field of view F. Therefore, the width (width in the fifth direction L) on the upper side (positive side of the sixth direction V) of the transmission portion 310 is allowed to be narrower than the width (width in the fifth direction L) on the lower side (negative side of the sixth direction V) of the transmission portion 310.

When seen from the direction perpendicular to the base material 300A (cover portion 300) (fourth direction N), the heater portion 320 surrounds the transmission portion 310 and is disconnected at a portion around the transmission portion 310. Specifically, the heater portion 320 is disposed on the upper side (positive side of the sixth direction V) of the transmission portion 310, on the lower side (negative side of the sixth direction V) of the transmission portion 310, and on one of opposite lateral sides (positive side of the fifth direction L) of the transmission portion 310. On the other hand, the heater portion 320 is not disposed on the other of the opposite lateral sides (negative side of the fifth direction L) of the transmission portion 310. However, the layout of the heater portion 320 is not limited to the layout according to the present embodiment. For example, the heater portion 320 may not be disposed on one of the opposite lateral sides (the positive side or the negative side of the fifth direction L) of the transmission portion 310 or on the upper side (positive side of the sixth direction V) of the transmission portion 310. In this case, for example, the heater portion 320 may be disposed only on the upper side (positive side of the sixth direction V) of the transmission portion 310 and on the lower side (negative side of the sixth direction V) of the transmission portion 310 or only on the lower side (negative side of the sixth direction V) of the transmission portion 310.

The heater portion 320 extends from one to the other of the upper side (positive side of the sixth direction V) and the lower side (negative side of the sixth direction V) of the transmission portion 310 through the one of the opposite lateral sides (positive side of the fifth direction L) of the transmission portion 310. The heater portion 320 extends from one to the other of the upper side (positive side of the sixth direction V) and the lower side (negative side of the sixth direction V) of the transmission portion 310 through the opposite lateral sides (the positive side and the negative side of the fifth direction L) of the transmission portion 310. Namely, the heater portion 320 extends from one to the other of the upper side (positive side of the sixth direction V) and the lower side (negative side of the sixth direction V) of the transmission portion 310 through at least one of the opposite lateral sides of the transmission portion 310.

The heater portion 320 on the upper side (positive side of the sixth direction V) of the transmission portion 310, the heater portion 320 on the lower side (negative side of the sixth direction V) of the transmission portion 310, and the heater portion 320 on the one of the opposite lateral sides (positive side of the fifth direction L) of the transmission portion 310 are electrically connected to each other. Therefore, a common electric current (the same electric current) flows through the heater portion 320 on the upper side (positive side of the sixth direction V) of the transmission portion 310, through the heater portion 320 on the lower side (negative side of the sixth direction V) of the transmission portion 310, and through the heater portion 320 on the one of the opposite lateral sides (positive side of the fifth direction L) of the transmission portion 310.

Each of the amount of heat generated per unit length of the heater portion 320 in a direction along an outer periphery of the transmission portion 310 on the lower side (negative side of the sixth direction V) of the transmission portion 310 and the amount of heat generated per unit length of the heater portion 320 in a direction along the outer periphery of the transmission portion 310 on the upper side (positive side of the sixth direction V) of the transmission portion 310 is higher than the amount of heat generated per unit length of the heater portion 320 in a direction along the outer periphery of the transmission portion 310 on the one of the opposite lateral sides (positive side of the fifth direction L) of the transmission portion 310. The heater portion 320 is, for example, a film heater. For example, the heater portion 320 includes a wiring (for example, a meandering wiring) that extends alternately back and forth along the direction along the outer periphery of the transmission portion 310. Alternatively, the heater portion 320 may include a plurality of electrodes (for example, interdigitated electrodes) that are arranged along the direction along the outer periphery of the transmission portion 310 and that are electrically connected to each other. In these examples, the wider a width (width in a direction orthogonal to the direction along the outer periphery of the transmission portion 310) of the heater portion 320 is, the higher the amount of heat generated per unit length of the heater portion 320 in the direction along the outer periphery of the transmission portion 310 is. When seen from the direction perpendicular to the base material 300A (cover portion 300) (fourth direction N), each of a width WL (width in a direction orthogonal to the direction along the outer periphery of the transmission portion 310) of the heater portion 320 on the lower side (negative side of the sixth direction V) of the transmission portion 310 and a width WU (width in a direction orthogonal to the direction along the outer periphery of the transmission portion 310) of the heater portion 320 on the upper side (positive side of the sixth direction V) of the transmission portion 310 is wider than a width WS1 (width in a direction orthogonal to the direction along the outer periphery of the transmission portion 310) of the heater portion 320 on the one of the opposite lateral sides (positive side of the fifth direction L) of the transmission portion 310. Therefore, the amount of heat generated per unit length of the heater portion 320 in the direction along the outer periphery of the transmission portion 310 can be adjusted as described above. However, a method of adjusting the amount of heat generated per unit length of the heater portion 320 in the direction along the outer periphery of the transmission portion 310 is not limited to this example.

A length of the heater portion 320 in the direction along the outer periphery of the transmission portion 310 on the upper side (positive side of the sixth direction V) of the transmission portion 310, a length of the heater portion 320 in the direction along the outer periphery of the transmission portion 310 on the lower side (negative side of the sixth direction V) of the transmission portion 310, and a length of the heater portion 320 in the direction along the outer periphery of the transmission portion 310 on the one of the opposite lateral sides (positive side of the fifth direction L) of the transmission portion 310 decrease in order. In the present embodiment, each of the amount of heat generated in the heater portion 320 on the lower side (negative side of the sixth direction V) of the transmission portion 310 and the amount of heat generated in the heater portion 320 on the upper side (positive side of the sixth direction V) of the transmission portion 310 is higher than the amount of heat generated in the heater portion 320 on the one of the opposite lateral sides (positive side of the fifth direction L) of the transmission portion 310.

Air heated by the heater portion 320 on the lower side (negative side of the sixth direction V) of the transmission portion 310 moves upward (positive direction of the sixth direction V) because of convection. In consideration of the convection of air, when the amount of heat generated per unit length of the heater portion 320 in the direction along the outer periphery of the transmission portion 310 on the lower side (negative side of the sixth direction V) of the transmission portion 310 is higher than the amount of heat generated per unit length of the heater portion 320 in the direction along the outer periphery of the transmission portion 310 on the one of the opposite lateral sides (positive side of the fifth direction L) of the transmission portion 310, the transmission portion 310 can be efficiently heated, for example, as compared to a case where the amount of heat generated per unit length of the heater portion 320 in the direction along the outer periphery of the transmission portion 310 on the lower side (negative side of the sixth direction V) of the transmission portion 310 is equal to the amount of heat generated per unit length of the heater portion 320 in the direction along the outer periphery of the transmission portion 310 on the one of the opposite lateral sides (positive side of the fifth direction L) of the transmission portion 310. When the amount of heat generated in the heater portion 320 on the lower side (negative side of the sixth direction V) of the transmission portion 310 is higher than the amount of heat generated in the heater portion 320 on the one of the opposite lateral sides (positive side of the fifth direction L) of the transmission portion 310, the transmission portion 310 can be more efficiently heated, for example, as compared to a case where the amount of heat generated in the heater portion 320 on the lower side (negative side of the sixth direction V) of the transmission portion 310 is equal to the amount of heat generated in the heater portion 320 on the one of the opposite lateral sides (positive side of the fifth direction L) of the transmission portion 310.

From the viewpoint of increasing the amount of heat generated in the heater portion 320 on the lower side (negative side of the sixth direction V) of the transmission portion 310 to some extent than the amount of heat generated in the heater portion 320 on the lateral side (positive side of the fifth direction L) of the transmission portion 310, a ratio WL/WS1 of the width WL of the heater portion 320 on the lower side (negative side of the sixth direction V) of the transmission portion 310 to the width WS1 of the heater portion 320 on the one of the opposite lateral sides (positive side of the fifth direction L) of the transmission portion 310 may be, for example, 110% or more, 150% or more, or 175% or more. From the viewpoint of securing a certain amount of heat generated in the heater portion 320 on the lateral side (positive side of the fifth direction L) of the transmission portion 310, the ratio WL/WS1 of the width WL of the heater portion 320 on the lower side (negative side of the sixth direction V) of the transmission portion 310 to the width WS1 of the heater portion 320 on the one of the opposite lateral sides (positive side of the fifth direction L) of the transmission portion 310 may be, for example, 300% or less, 250% or less, or 225% or less.

The convection of air can be promoted by the heating of air by the heater portion 320 on the lower side (negative side of the sixth direction V) of the transmission portion 310 and by the heating of air by the heater portion 320 on the upper side (positive side of the sixth direction V) of the transmission portion 310. In consideration of the convection of air, when the amount of heat generated per unit length of the heater portion 320 in the direction along the outer periphery of the transmission portion 310 on the upper side (positive side of the sixth direction V) of the transmission portion 310 is higher than the amount of heat generated per unit length of the heater portion 320 in the direction along the outer periphery of the transmission portion 310 on the one of the opposite lateral sides (positive side of the fifth direction L) of the transmission portion 310, the transmission portion 310 can be efficiently heated, for example, as compared to a case where the amount of heat generated per unit length of the heater portion 320 in the direction along the outer periphery of the transmission portion 310 on the upper side (positive side of the sixth direction V) of the transmission portion 310 is equal to the amount of heat generated per unit length of the heater portion 320 in the direction along the outer periphery of the transmission portion 310 on the one of the opposite lateral sides (positive side of the fifth direction L) of the transmission portion 310. When the amount of heat generated in the heater portion 320 on the upper side (positive side of the sixth direction V) of the transmission portion 310 is higher than the amount of heat generated in the heater portion 320 on the one of the opposite lateral sides (positive side of the fifth direction L) of the transmission portion 310, the transmission portion 310 can be more efficiently heated, for example, as compared to a case where the amount of heat generated in the heater portion 320 on the upper side (positive side of the sixth direction V) of the transmission portion 310 is equal to the amount of heat generated heat in the heater portion 320 on the one of the opposite lateral sides (positive side of the fifth direction L) of the transmission portion 310.

As described above, in the present embodiment, the length LV2 of the transmission portion 310 in the longitudinal direction (sixth direction V) is shorter than the length LL2 of the transmission portion 310 in the lateral direction (fifth direction L). Therefore, the heat conduction of the transmission portion 310 by the heater portion 320 is faster over the entirety of the transmission portion 310 in the longitudinal direction (sixth direction V) of the transmission portion 310 than in the lateral direction (fifth direction L) of the transmission portion 310. Therefore, when at least one of the amount of heat generated per unit length of the heater portion 320 in the direction along the outer periphery of the transmission portion 310 on the upper side (positive side of the sixth direction V) of the transmission portion 310 and the amount of heat generated per unit length of the heater portion 320 in the direction along the outer periphery of the transmission portion 310 on the lower side (negative side of the sixth direction V) of the transmission portion 310 is higher than the amount of heat generated per unit length of the heater portion 320 in the direction along the outer periphery of the transmission portion 310 on the one of the opposite lateral sides (positive side of the fifth direction L)

of the transmission portion 310, the transmission portion 310 can be efficiently heated, for example, as compared to a case where each of the amount of heat generated per unit length of the heater portion 320 in the direction along the outer periphery of the transmission portion 310 on the upper side (positive side of the sixth direction V) of the transmission portion 310 and the amount of heat generated per unit length of the heater portion 320 in the direction along the outer periphery of the transmission portion 310 on the lower side (negative side of the sixth direction V) of the transmission portion 310 is equal to the amount of heat generated per unit length of the heater portion 320 in the direction along the outer periphery of the transmission portion 310 on the one of the opposite lateral sides (positive side of the fifth direction L) of the transmission portion 310.

The heater portion 320 is disconnected at least at a portion around the thermistor portion 330 (details will be described later). In this case, an influence on the thermistor portion 330 induced by the direct transfer of heat generated from the heater portion 320 to the thermistor portion 330 can be reduced as compared to a case where the heater portion 320 is not disconnected at any portion around the thermistor portion 330. In the present embodiment, the heater portion 320 is disconnected on a side (negative side of the fifth direction L) of the opposite lateral sides (the positive side and the negative side of the fifth direction L) of the transmission portion 310 where the thermistor portion 330 is disposed. Specifically, when seen from a thermistor portion 330 side (negative side of the fifth direction L) with respect to the transmission portion 310, the heater portion 320 is disconnected over the entirety of a region overlapping the thermistor portion 330 (region on the negative side of the fifth direction L of the thermistor portion 330). In this case, an influence on the thermistor portion 330 induced by the direct transfer of heat generated from the heater portion 320 to the thermistor portion 330 can be reduced as compared to a case where a portion of the heater portion 320 overlaps the thermistor portion 330 when seen from the thermistor portion 330 side (negative side of the fifth direction L) with respect to the transmission portion 310. However, the heater portion 320 may not be disconnected at any portion around the thermistor portion 330.

The heater portion 320 is disposed on a second surface 304 side of the base material 300A in the thickness direction (fourth direction N) of the base material 300A (cover portion 300). However, the position of the heater portion 320 with respect to the base material 300A in the thickness direction (fourth direction N) of the base material 300A (cover portion 300) is not limited to the position according to the present embodiment. For example, the heater portion 320 may be disposed on a first surface 302 side of the base material 300A or may be disposed on both the first surface 302 side and the second surface 304 side of the base material 300A. Alternatively, for example, when the base material 300A includes a plurality of films laminated in the thickness direction (fourth direction N) of the base material 300A, the heater portion 320 may be disposed between adjacent films. In such a manner, the heater portion 320 may be disposed at least on the first surface 302 side of the base material 300A, on the second surface 304 side, or between the first surface 302 and the second surface 304 in the thickness direction (fourth direction N) of the base material 300A (cover portion 300).

The heater terminal 322 is disposed on the upper side (positive side of the sixth direction V) of the transmission portion 310. A portion of the heater portion 320 surrounds at least a portion around the heater terminal 322. In the present embodiment, the heater portion 320 on the upper side (positive direction of the sixth direction V) of the transmission portion 310 surrounds opposite lateral sides (the positive side and the negative side of the fifth direction L) and an upper side (positive side of the sixth direction V) of the heater terminal 322. Generally, it is difficult to overlap the heater terminal 322 with the heater portion 320 in the thickness direction (fourth direction N) of the base material 300A (cover portion 300). In consideration of the convection of air, the heater portion 320 disposed on the lower side (negative side of the sixth direction V) of the transmission portion 310 makes more contribution to the efficient heating of the transmission portion 310 than the heater portion 320 disposed on the upper side (positive side of the sixth direction V) of the transmission portion 310. In the present embodiment, a space provided to dispose the heater terminal 322 (region where a portion of the heater portion 320 is cut out) is disposed on the upper side (positive side of the sixth direction V) of the transmission portion 310. Therefore, according to the present embodiment, a reduction in the amount of heat generated in the heater portion 320 caused by the disposition of the heater terminal 322 can be suppressed as compared to a case where the heater terminal 322 is disposed on the lower side (negative side of the sixth direction V) of the transmission portion 310. Namely, the heater portion 320 and the heater terminal 322 are disposed such that the transmission portion 310 is efficiently heated. However, the position of the heater terminal 322 is not limited to the position according to the present embodiment. For example, the heater terminal 322 may be disposed on the lower side (negative side of the sixth direction V) or the lateral side (the positive side or the negative side of the fifth direction L) of the transmission portion 310. The heater portion 320 may surround the entirety of the heater terminal 322 (the upper side (positive side of the sixth direction V), the lower side (negative side of the sixth direction V), and the opposite lateral sides (the positive side of the fifth direction L and the negative side of the fifth direction L) of the heater terminal 322).

The heater terminal 322 is located on the same side as a side on which the thermistor portion 330 is located (negative side of the fifth direction L) with respect to the center of the transmission portion 310 in the lateral direction (fifth direction L). Therefore, a heater wiring (not illustrated) connected to the heater terminal 322, a thermistor wiring (not illustrated) connected to the thermistor portion 330, and a control circuit (not illustrated and, for example, an integrated circuit (IC)) connected to the heater wiring and to the thermistor wiring can be collectively disposed on the same side (negative side of the fifth direction L) with respect to the center of the transmission portion 310 in the lateral direction (fifth direction L). Therefore, the elements (for example, the heater wiring, the thermistor wiring, and the control circuit) connected to the heater terminal 322 and to the thermistor portion 330 can be efficiently disposed as compared to a case where the heater terminal 322 and the thermistor portion 330 are located opposite to each other with respect to the center of the transmission portion 310 in the lateral direction (fifth direction L). However, the layout of the heater terminal 322 and the thermistor portion 330 is not limited to the layout according to the present embodiment. For example, the heater terminal 322 and the thermistor portion 330 may be located opposite to each other with respect to the center of the transmission portion 310 in the lateral direction (fifth direction L).

The heater terminal 322 is disposed on the second surface 304 side of the base material 300A in the thickness direction (fourth direction N) of the base material 300A (cover portion 300). However, the position of the heater terminal 322 with respect to the base material 300A in the thickness direction (fourth direction N) of the base material 300A (cover portion 300) is not limited to the position according to the present embodiment. For example, the heater terminal 322 may be disposed on the first surface 302 side of the base material 300A or may be disposed on both the first surface 302 side and the second surface 304 side of the base material 300A. Alternatively, for example, when the base material 300A includes a plurality of films laminated in the thickness direction (fourth direction N) of the base material 300A, the heater terminal 322 may be disposed between adjacent films. In such a manner, the heater terminal 322 may be disposed at least on the first surface 302 side of the base material 300A, on the second surface 304 side, or between the first surface 302 and the second surface 304 in the thickness direction (fourth direction N) of the base material 300A (cover portion 300).

In FIG. 3, the region where the thermistor portion 330 may be disposed is indicated by a hatched triangle. The thermistor portion 330 is disposed in at least a portion of the region indicated by the hatched triangle. In this case, the thermistor portion 330 may be disposed only in a portion of the region indicated by the hatched triangle or may be disposed over the entirety of the region indicated by the hatched triangle.

The thermistor portion 330 is disposed in the region where the foregoing portion of the substantially quadrilateral shape of the transmission portion 310 is cut out. Specifically, the thermistor portion 330 is disposed in a region where one corner of the substantially quadrilateral shape of the transmission portion 310 (corner between the one side on the negative side of the fifth direction L and the one side on the negative side of the sixth direction V) is cut out. On the other hand, the thermistor portion is not disposed in a region where another corner of the substantially quadrilateral shape of the transmission portion 310 (corner between the one side on the positive side of the fifth direction L and the one side on the negative side of the sixth direction V) is cut out, the another corner sharing one side of the substantially quadrilateral shape (one side on the negative side of the sixth direction V) with the one corner of the substantially quadrilateral shape (corner between the one side on the negative side of the fifth direction L and the one side on the negative side of the sixth direction V). Instead, a portion of the heater portion 320 is disposed in the region where the another corner of the substantially quadrilateral shape of the transmission portion 310 (corner between the one side on the positive side of the fifth direction L and the one side on the negative side of the sixth direction V) is cut out.

According to the present embodiment, a portion of the substantially quadrilateral shape of the transmission portion 310 (corner between the one side on the negative side of the fifth direction L and the one side on the negative side of the sixth direction V) is cut out, so that the space for disposing the thermistor portion 330 can be formed by the amount by which the portion of the transmission portion 310 is cut out. Therefore, a space required to provide the transmission portion 310 and the thermistor portion 330 can be reduced. According to the present embodiment, the region where the thermistor portion 330 is disposed is easily provided along the outer edge of the intersection portion CP of the field of view F, for example, as compared to a case where the thermistor portion 330 is disposed in a region where a portion of one side of the substantially quadrilateral shape of the transmission portion 310 is cut out (notch of one side of the substantially quadrilateral shape of the transmission portion 310). However, the thermistor portion 330 may be disposed in the region where a part of one side of the substantially quadrilateral shape of the transmission portion 310 is cut out (notch of one side of the substantially quadrilateral shape of the transmission portion 310).

According to the present embodiment, a portion of the substantially quadrilateral shape of the transmission portion 310 (corner between the one side on the positive side of the fifth direction L and the one side on the negative side of the sixth direction V) is cut out, so that the space for disposing a portion of the heater portion 320 can be formed by the amount by which the portion of the transmission portion 310 is cut out. Therefore, the space required to provide the transmission portion 310 and the heater portion 320 can be reduced.

The region where the thermistor portion 330 is disposed is not limited to the region according to the present embodiment. For example, the thermistor portion 330 may be disposed in both the region where the one corner of the substantially quadrilateral shape of the transmission portion 310 (corner between one side on the negative side of the fifth direction L and the one side on the negative side of the sixth direction V) is cut out and the region where the another corner of the substantially quadrilateral shape of the transmission portion 310 (corner between the one side on the positive side of the fifth direction L and the one side on the negative side of the sixth direction V) is cut out. When the thermistor portion 330 is disposed only on one side (negative side of the fifth direction L) of the transmission portion 310 in the lateral direction (fifth direction L) as in the present embodiment, the another corner of the substantially quadrilateral shape of the transmission portion 310 (corner between the one side on the positive side of the fifth direction L and the one side on the negative side of the sixth direction V) may not be cut out on a side opposite to the region where the thermistor portion 330 is disposed (positive side of the fifth direction L).

Thermistor portion 330 is disposed on the second surface 304 side of the base material 300A in the thickness direction (fourth direction N) of the base material 300A (cover portion 300). However, the position of the thermistor portion 330 with respect to the base material 300A in the thickness direction (fourth direction N) of the base material 300A (cover portion 300) is not limited to the position according to the present embodiment. For example, the thermistor portion 330 may be disposed on the first surface 302 side of the base material 300A or may be disposed on both the first surface 302 side and the second surface 304 side of the base material 300A. Alternatively, for example, when the base material 300A includes a plurality of films laminated in the thickness direction (fourth direction N) of the base material 300A, the thermistor portion 330 may be disposed between adjacent films. In such a manner, the thermistor portion 330 may be disposed at least on the first surface 302 side of the base material 300A, on the second surface 304 side, or between the first surface 302 and the second surface 304 in the thickness direction (fourth direction N) of the base material 300A (cover portion 300).

In the present embodiment, the heater portion 320, the heater terminal 322, and the thermistor portion 330 are disposed to be aligned in the thickness direction (fourth direction N) of the base material 300A (cover portion 300). However, the heater portion 320, the heater terminal 322, and the thermistor portion 330 may be disposed to be offset in the thickness direction (fourth direction N) of the base material 300A (cover portion 300), for example, the heater portion 320 and the heater terminal 322 are disposed on the second surface 304 side of the base material 300A, and the thermistor portion 330 is disposed on the first surface 302 side of the base material 300A.

Figure 4:
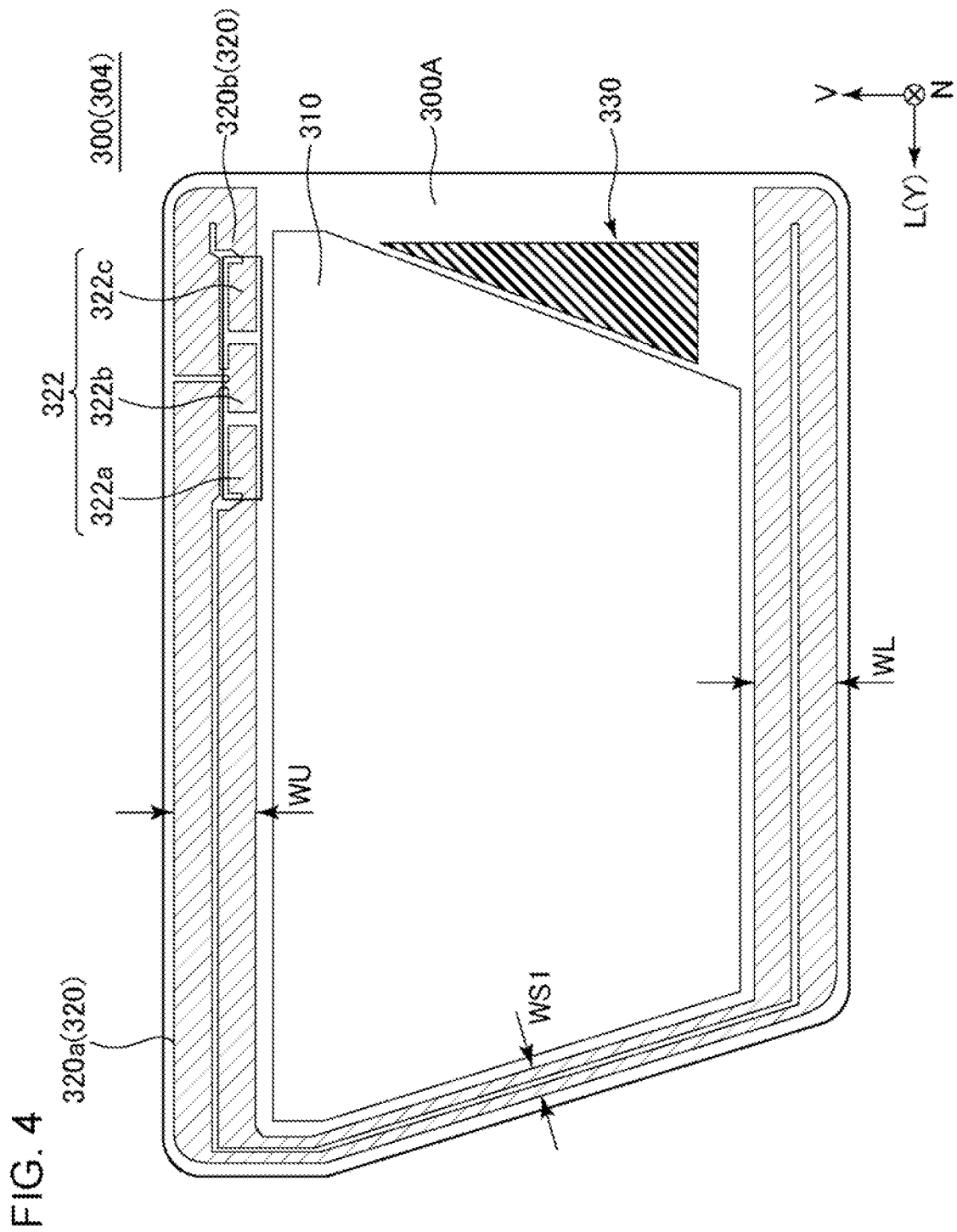
FIG. 4 is a plan view of one example of details of a heater portion and a heater terminal illustrated in FIG. 3.

FIG. 4 is a plan view of one example of details of the heater portion 320 and the heater terminal 322 illustrated in FIG. 3.

The heater portion 320 includes a first heater portion 320a and a second heater portion 320b. The heater terminal 322 includes a first terminal 322a, a second terminal 322b, and a third terminal 322c. The first terminal 322a, the second terminal 322b, and the third terminal 322c are arranged in order from the positive direction of the fifth direction L toward the negative direction of the fifth direction L. One end of the first heater portion 320a is connected to the first terminal 322a, and the other end of the first heater portion 320a is connected to the second terminal 322b. One end of the second heater portion 320b is connected to the third terminal 322c, and the other end of the second heater portion 320b is connected to the second terminal 322b.

When seen from the direction perpendicular to the second surface 304 of the cover portion 300 (negative direction of the fourth direction N), the first heater portion 320a extends from the first terminal 322a to surround the transmission portion 310 counterclockwise, turns around on a lower right side (the negative side of the fifth direction L and the negative side of the sixth direction V) of the transmission portion 310 to surround the transmission portion 310 clockwise, and reaches the second terminal 322b. When seen from the direction perpendicular to the second surface 304 of the cover portion 300 (negative direction of the fourth direction N), the second heater portion 320b extends rightward (toward the negative side of the fifth direction L) of the third terminal 322c and turns around on a right side (negative side of the fifth direction L) of the third terminal 322c to reach the second terminal 322b.

Each of the first heater portion 320a and the second heater portion 320b includes, for example, a wiring (for example, a meandering wiring) that extends alternately back and forth along the direction along the outer periphery of the transmission portion 310. Alternatively, each of the first heater portion 320a and the second heater portion 320b may include a plurality of electrodes (for example, interdigitated electrodes) that are arranged along the direction along the outer periphery of the transmission portion 310 and that are electrically connected to each other. In these examples, the wider a width (width in the direction orthogonal to the direction along the outer periphery of the transmission portion 310) of each of the first heater portion 320a and the second heater portion 320b is, the higher the amount of heat generated per unit length of each of the first heater portion 320a and the second heater portion 320b in the direction along the outer periphery of the transmission portion 310 is.

Figure 5:
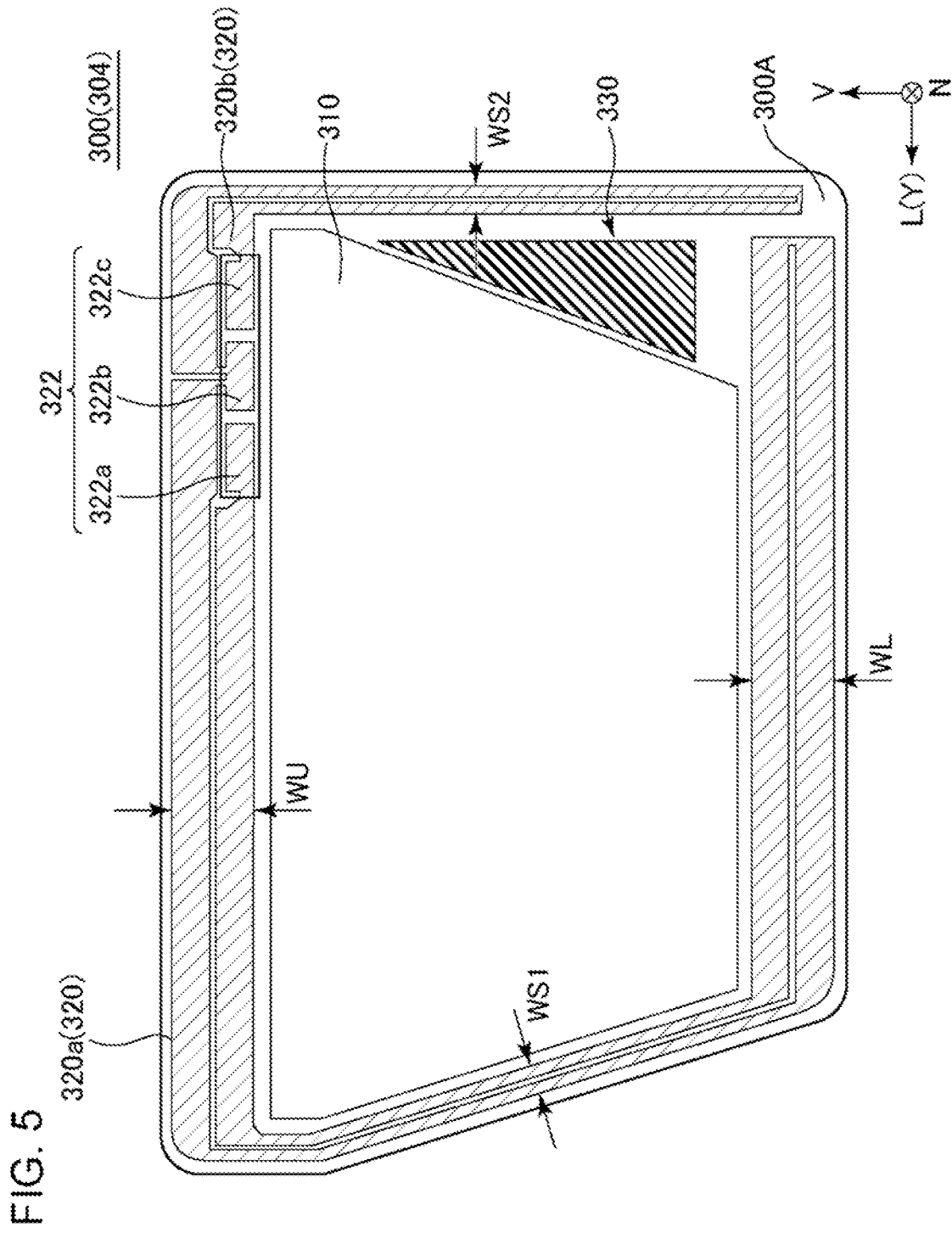
FIG. 5 is a view illustrating a modification example of FIG. 4.

FIG. 5 is a view illustrating a modification example of FIG. 4. The example illustrated in FIG. 5 is the same as the example illustrated in FIG. 4, except for the following points.

As illustrated in FIG. 5, when seen from the thermistor portion 330 side with respect to the transmission portion 310 (negative side of the fifth direction L), a portion of the heater portion 320 (second heater portion 320b) may overlap the thermistor portion 330. The second heater portion 320b extends from the third terminal 322c, extends on a right side (negative side of the fifth direction L) of the transmission portion 310 in the longitudinal direction (sixth direction V) of the transmission portion 310, and turns around on the lower right side (the negative side of the fifth direction L and the negative side of the sixth direction V) of the transmission portion 310 to reach the second terminal 322b.

Also, in the example illustrated in FIG. 5, the heater portion 320 is disconnected at a portion around the thermistor portion 330. Specifically, when seen from the direction perpendicular to the second surface 304 of the base material 300A (cover portion 300) (fourth direction N), the heater portion 320 is disconnected on a lower right side (the negative side of the fifth direction L and the negative side of the sixth direction V) of the thermistor portion 330. In this case, an influence on the thermistor portion 330 induced by the direct transfer of heat generated from the heater portion 320 to the thermistor portion 330 can be reduced as compared to a case where the heater portion 320 is not disconnected at any portion around the thermistor portion 330.

Figure 6:
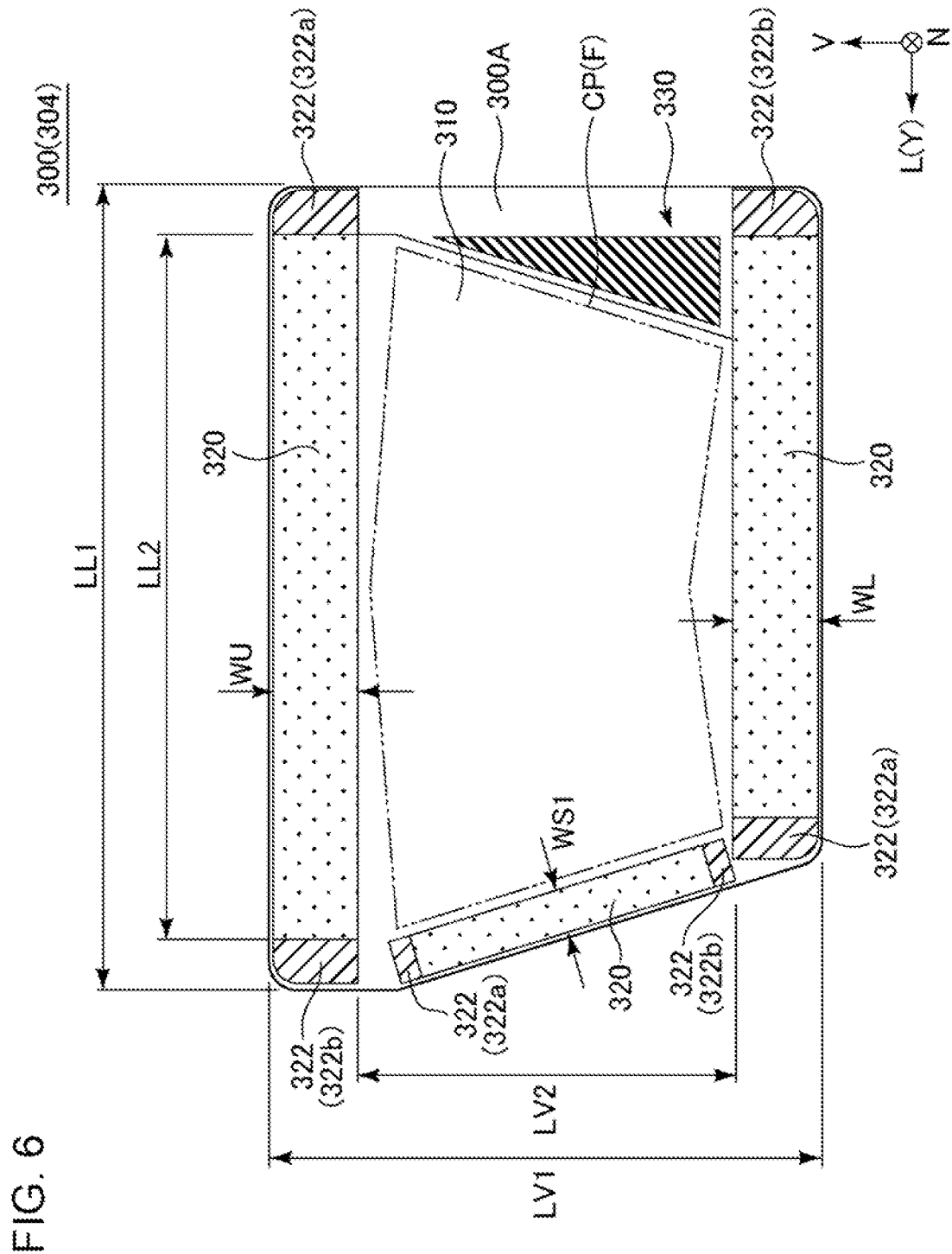
FIG. 6 is a view illustrating a first modification example of FIG. 3.

FIG. 6 is a view illustrating a first modification example of FIG. 3. The example illustrated in FIG. 6 is the same as the example illustrated in FIG. 3, except for the following points.

The cover portion 300 includes three heater portions 320 and six heater terminals 322 (three first terminals 322a and three second terminals 322b).

A first heater portion 320 is disposed on the lower side (negative side of the sixth direction V) of the transmission portion 310. The heater portion 320 extends in a direction along the outer periphery of the transmission portion 310 (fifth direction L). The first terminal 322a and the second terminal 322b are connected to opposite ends of the heater portion 320. Therefore, an electric current can flow through the heater portion 320 between the first terminal 322a and the second terminal 322b.

A second heater portion 320 is disposed on the upper side of the transmission portion 310 (positive side of the sixth direction V). The heater portion 320 extends in a direction along the outer periphery of the transmission portion 310 (fifth direction L). The first terminal 322a and the second terminal 322b are connected to opposite ends of the heater portion 320. Therefore, an electric current can flow through the heater portion 320 between the first terminal 322a and the second terminal 322b.

A third heater portion 320 is disposed on one of the opposite lateral sides (positive side of the fifth direction L) of the transmission portion 310. The heater portion 320 extends in a direction along the outer periphery of the transmission portion 310 (direction inclined from the sixth direction V toward the fifth direction L). The first terminal 322a and the second terminal 322b are connected to opposite ends of the heater portion 320. Therefore, an electric current can flow through the heater portion 320 between the first terminal 322a and the second terminal 322b.

In the present modification example, the amount of heat generated per unit length of each of the heater portions 320 in the direction along the outer periphery of the transmission portion 310 can be adjusted by adjusting the electric current flowing through each of the heater portions 320. In the present modification example, for example, even if the width WL of the heater portion 320 on the lower side (negative side of the sixth direction V) of the transmission portion 310, the width WU of the heater portion 320 on the upper side (positive side of the sixth direction V) of the transmission portion 310, and the width WS1 of the heater portion 320 on the one of the opposite lateral sides (positive side of the fifth direction L) of the transmission portion 310 are equal, for example, at least one of the amount of heat generated per unit length of the heater portion 320 in the direction along the outer periphery of the transmission portion 310 on the upper side (positive side of the sixth direction V) of the transmission portion 310 and the amount of heat generated per unit length of the heater portion 320 in the direction along the outer periphery of the transmission portion 310 on the lower side (negative side of the sixth direction V) of the transmission portion 310 can be higher than the amount of heat generated per unit length of the heater portion 320 in the direction along the outer periphery of the transmission portion 310 on the one of the opposite lateral sides (positive side of the fifth direction L) of the transmission portion 310.

Figure 7:
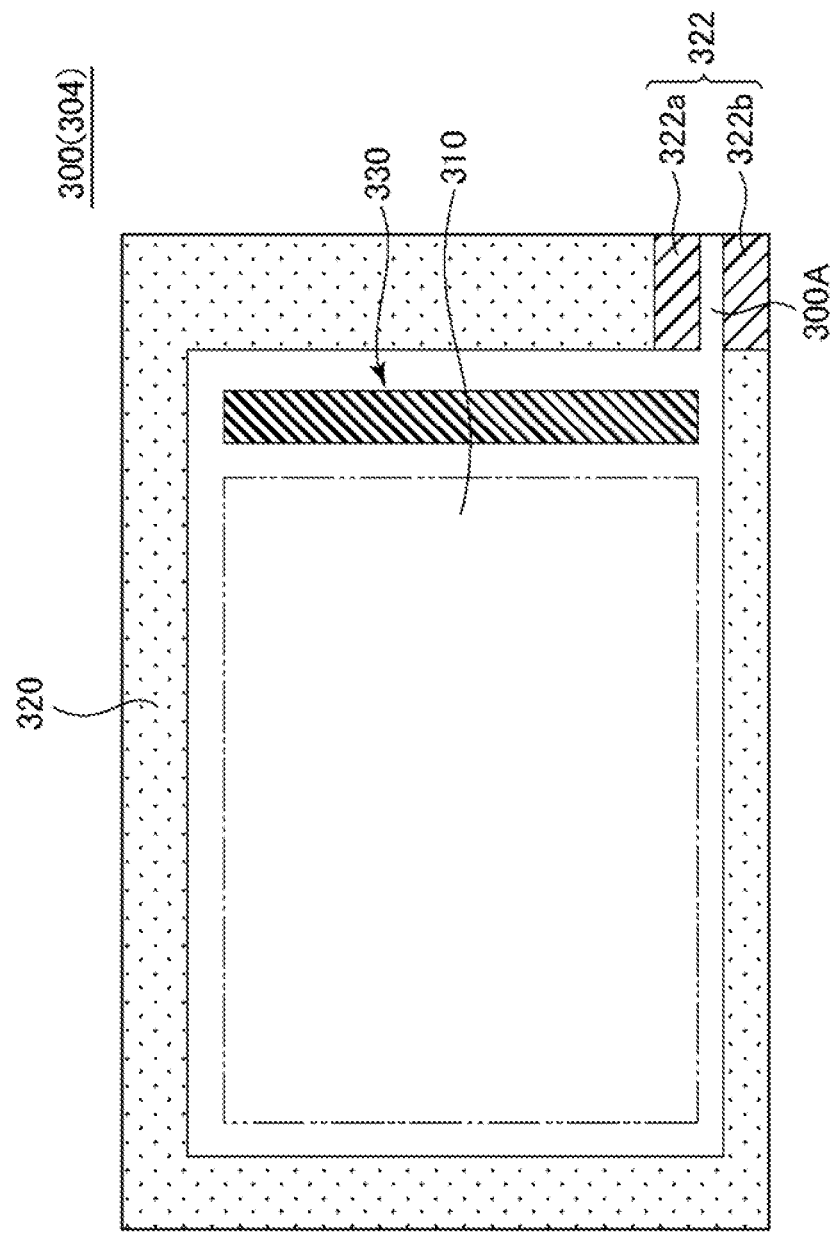
FIG. 7 is a view illustrating a second modification example of FIG. 3.

FIG. 7 is a view illustrating a second modification example of FIG. 3.

The cover portion 300 (base material 300A) and the transmission portion 310 have a substantially quadrilateral shape.

Also, in the example illustrated in FIG. 7, the heater portion 320 is disconnected at a portion around the thermistor portion 330. Specifically, when seen from the direction perpendicular to the second surface 304 of the base material 300A (cover portion 300) (fourth direction N), the heater portion 320 is disconnected on a lower right side (the negative side of the fifth direction L and the negative side of the sixth direction V) of the thermistor portion 330. In this case, an influence on the thermistor portion 330 induced by the direct transfer of heat generated from the heater portion 320 to the thermistor portion 330 can be reduced as compared to a case where the heater portion 320 is not disconnected at any portion around the thermistor portion 330.

Figure 8:
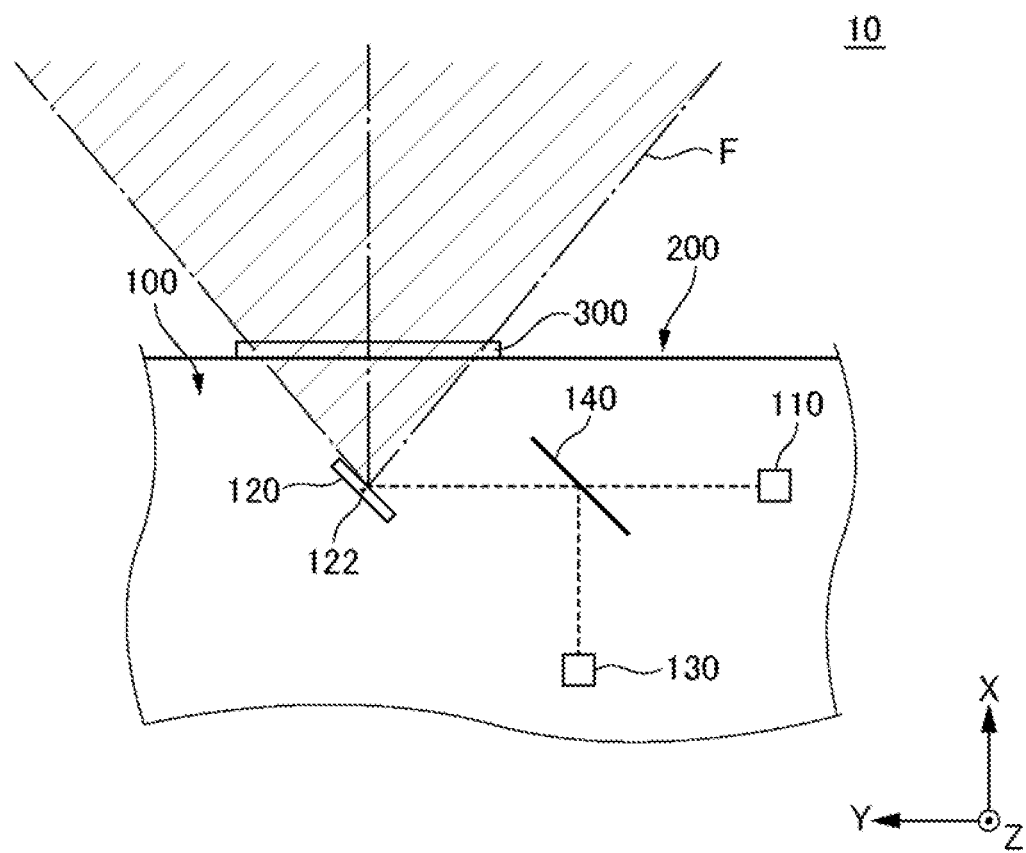
FIG. 8 is a view for describing one example of an operation of an optical device accommodated in a housing illustrated in FIGS. 1 and 2.

FIG. 8 is a view for describing one example of an operation of the optical device 100 accommodated in the housing 200 illustrated in FIGS. 1 and 2.

The optical device 100 includes a transmitting unit 110, a movable reflecting unit 120, a receiving unit 130, and a beam splitter 140. In FIG. 8, the transmitting unit 110, the movable reflecting unit 120, the receiving unit 130, and the beam splitter 140 are schematically located in one plane parallel to both the first direction X and the second direction Y. However, in the actual layout, the transmitting unit 110, the movable reflecting unit 120, the receiving unit 130, and the beam splitter 140 may not be located in one plane parallel to both the first direction X and the second direction Y or may be located in one plane parallel to both the first direction X and the second direction Y.

In FIG. 8, an electromagnetic wave propagating through the transmitting unit 110, the movable reflecting unit 120, the receiving unit 130, and the beam splitter 140 is illustrated by broken lines.

The transmitting unit 110 transmits an electromagnetic wave. In one example, the electromagnetic wave transmitted by the transmitting unit 110 is light, specifically, an infrared ray. However, the electromagnetic wave transmitted by the transmitting unit 110 may be light having a wavelength different from the wavelength of an infrared ray (for example, visible light or an ultraviolet ray) or may be an electromagnetic wave having a wavelength different from the wavelength of light (for example, a radio wave). In one example, the transmitting unit 110 transmits a pulse wave. However, the transmitting unit 110 may transmit a continuous wave (CW). In one example, the transmitting unit 110 is an element capable of converting electrical energy (for example, electric current) into an electromagnetic wave (for example, a laser diode (LD)).

The electromagnetic wave transmitted from the transmitting unit 110 transmits through the beam splitter 140, is incident on the movable reflecting unit 120, and is reflected by the movable reflecting unit 120. The movable reflecting unit 120 is, for example, a micro-electromechanical systems (MEMS) mirror. The movable reflecting unit 120 is located at the predetermined position.

The electromagnetic wave reflected by the movable reflecting unit 120 transmits through the cover portion 300 and is emitted toward the outside of the sensor device 10. The electromagnetic wave emitted toward the outside of the sensor device 10 is incident on a target (not illustrated in FIG. 8) such as an object existing outside the sensor device 10, and is reflected or scattered by the target. The electromagnetic wave reflected or scattered by the target transmits through the cover portion 300 and is incident on the movable reflecting unit 120. The electromagnetic wave incident on the movable reflecting unit 120 is incident on the receiving unit 130 through the reflection by the movable reflecting unit 120 and through the reflection by the beam splitter 140 in order. The receiving unit 130 receives the electromagnetic wave incident on the receiving unit 130. In one example, the receiving unit 130 is an element capable of converting an electromagnetic wave into electrical energy (for example, electric current) (for example, an avalanche photodiode (APD)).

The sensor device 10 is, for example, a light detection and ranging (LiDAR). In one example, the sensor device 10 measures a distance between the sensor device 10 and the target such as an object existing outside the sensor device 10, based on time of flight (ToF). In this example, the sensor device 10 calculates the distance based on a difference between a time when the electromagnetic wave is transmitted from the sensor device 10 (for example, a time when the electromagnetic wave is transmitted from the transmitting unit 110) and a time when the electromagnetic wave that is transmitted from the sensor device 10 and is reflected or scattered by the target existing outside the sensor device 10 is received by the sensor device 10 (for example, a time when the electromagnetic wave is received by the receiving unit 130).

When seen from the positive direction of the third direction Z, the field of view F expands toward the front of the sensor device 10 (positive direction of the first direction X). Specifically, the movable reflecting unit 120 is swingable around a shaft 122. The shaft 122 extends along the third direction Z. The field of view F of the optical device 100 is determined according to a maximum swing angle of the movable reflecting unit 120. When the movable reflecting unit 120 swings counterclockwise by the maximum swing angle of the optical device 100 when seen from the positive direction of the third direction Z, the electromagnetic wave that is transmitted from the transmitting unit 110 and is reflected by the movable reflecting unit 120 passes through one end portion of the field of view F (left end portion of the field of view F in FIG. 8). When the movable reflecting unit 120 swings clockwise by the maximum swing angle of the optical device 100 when seen from the positive direction of the third direction Z, the electromagnetic wave that is transmitted from the transmitting unit 110 and is reflected by the movable reflecting unit 120 passes through the other end portion on an opposite side of the field of view F from the one end portion (right end portion of the field of view F in FIG. 8). When the swing angle of the movable reflecting unit 120 is 0 degrees when seen from the positive direction of the third direction Z, the electromagnetic wave that is transmitted from the transmitting unit 110 and is reflected by the movable reflecting unit 120 passes through a center of the field of view F.

The movable reflecting unit 120 is also swingable around a shaft (not illustrated) extending along a direction (second direction Y) intersecting, specifically, orthogonal to both the one direction (positive direction of the first direction X) and an extending direction (third direction Z) of the shaft 122. Therefore, when seen from the positive direction or the negative direction of the second direction Y, the field of view F expands toward the front of the sensor device 10 (positive direction of the first direction X).

In the present embodiment, the optical device 100 is a coaxial LiDAR. Namely, an axis through which the electromagnetic wave emitted from the optical device 100 (electromagnetic wave emitted toward the outside of the optical device 100 by the movable reflecting unit 120) passes and an axis through which the electromagnetic wave returning to the optical device 100 (electromagnetic wave that is emitted from the optical device 100, is reflected or scattered by the target existing outside the optical device 100, and is incident on the movable reflecting unit 120) passes coincide with each other. However, the optical device 100 may be a biaxial LiDAR. Namely, the optical device 100 may not include the movable reflecting unit 120. In this case, the axis through which the electromagnetic wave emitted from the optical device 100 passes and the axis through which the electromagnetic wave returning to the optical device 100 (electromagnetic wave that is emitted from the optical device 100, is reflected or scattered by the target existing outside the optical device 100, and is incident on the optical device 100) passes are offset from each other.

The embodiment and the modification examples have been described above with reference to the drawings, but these have been provided as examples of the present invention, and various configurations other than the above can be adopted.

For example, in the present embodiment, the field of view F of the optical device 100 is a field of view of an optical scanning device such as a LiDAR. However, the field of view F of the optical device 100 may be a field of view of an imaging device such as a camera.

This application claims priority based on Japanese Patent Application No. 2020-011447, filed on Jan. 28, 2020, the disclosure of which is incorporated by reference in its entirety.

REFERENCE SIGNS LIST

10 sensor device
100 optical device
110 transmitting unit
120 movable reflecting unit
122 shaft
130 receiving unit
140 beam splitter
200 housing
210 attachment frame
300 cover portion
300A base material
302 first surface
304 second surface
310 transmission portion
320 heater portion
320a first heater portion
320b second heater portion
322 heater terminal
322a first terminal
322b second terminal
322c third terminal
330 thermistor portion
CP intersection portion
F field of view
L fifth direction
N fourth direction
V sixth direction
X first direction
Y second direction
Z third direction

The invention claimed is:

1. A sensor device comprising:
an optical device that emits an electromagnetic wave;
a housing that accommodates the optical device;
a transmission portion provided in the housing to transmit the electromagnetic wave of the optical device, a length of the transmission portion in a longitudinal direction being shorter than a length of the transmission portion in a lateral direction;
a heater portion that surrounds the transmission portion; and
a thermistor portion disposed in an outer area of the transmission portion and disposed on one side of lateral sides of the transmission portion,
wherein the heater portion is disconnected on a side of the lateral sides of the transmission portion, the thermistor portion being disposed on the side of the lateral sides.

2. The sensor device according to claim 1,
wherein an amount of heat generated in the heater portion on a lower side of the transmission portion is higher than an amount of heat generated in the heater portion on one of opposite lateral sides of the transmission portion.

3. The sensor device according to claim 1,
wherein an amount of heat generated per unit length of the heater portion in a direction along an outer periphery of the transmission portion on an upper side of the transmission portion is higher than an amount of heat generated per unit length of the heater portion in the direction along the outer periphery of the transmission portion on one of opposite lateral sides of the transmission portion.

4. The sensor device according to claim 3,
wherein an amount of heat generated in the heater portion on the upper side of the transmission portion is higher than an amount of heat generated in the heater portion on the one of the opposite lateral sides of the transmission portion.

5. The sensor device according to claim 1, the heater portion is not in direct contact with the thermistor portion.

6. A housing to accommodate an optical device that emits an electromagnetic wave, comprising:
a transmission portion that transmits the electromagnetic wave of the optical device, a length of the transmission portion in a longitudinal direction being shorter than a length of the transmission portion in a lateral direction;
a heater portion that surrounds the transmission portion; and
a thermistor portion disposed in an outer area of the transmission portion and disposed on one side of lateral sides of the transmission portion,
wherein the heater portion is disconnected on a side of the lateral sides of the transmission portion, the thermistor portion being disposed on the side of the lateral sides.

7. A cover portion to be attached to a housing to accommodate an optical device that emits an electromagnetic wave, comprising:
a transmission portion that transmits the electromagnetic wave of the optical device, a length of the transmission portion in a longitudinal direction being shorter than a length of the transmission portion in a lateral direction;

a heater portion that surrounds the transmission portion; and
a thermistor portion disposed in an outer area of the transmission portion and disposed on one side of lateral sides of the transmission portion,
wherein the heater portion is disconnected on a side of the lateral sides of the transmission portion, the thermistor portion being disposed on the side of the lateral sides.

* * * * *